(12) United States Patent
Teramoto

(10) Patent No.: US 7,536,105 B2
(45) Date of Patent: May 19, 2009

(54) SYNCHRONOUS DATA TRANSMISSION FROM PLURAL REMOTE RADIO DEVICES IN W-CDMA BASE STATION

(75) Inventor: Tomoyuki Teramoto, Tokyo (JP)

(73) Assignee: NEC Corporation, Tokyo (JP)

( * ) Notice: Subject to any disclaimer, the term of this patent is extended or adjusted under 35 U.S.C. 154(b) by 497 days.

(21) Appl. No.: 11/350,729

(22) Filed: Feb. 10, 2006

(65) Prior Publication Data

US 2006/0209925 A1    Sep. 21, 2006

(30) Foreign Application Priority Data

Mar. 1, 2005    (JP)    ............................. 2005-056220

(51) Int. Cl.
    *H04B 14/00*    (2006.01)
(52) U.S. Cl. ............................. 398/78; 398/77; 398/75; 398/98; 398/100
(58) Field of Classification Search ................... 398/78, 398/77, 75, 98, 99, 100; 375/145; 370/510
    See application file for complete search history.

(56) References Cited

U.S. PATENT DOCUMENTS

| | | | | |
|---|---|---|---|---|
| 5,610,913 | A * | 3/1997 | Tomonaga et al. | 370/219 |
| 5,654,815 | A * | 8/1997 | Bunse | 398/154 |
| 5,757,807 | A * | 5/1998 | Tezuka et al. | 370/541 |
| 6,581,114 | B1 * | 6/2003 | Sturm | 710/100 |
| 6,920,155 | B2 | 7/2005 | Rao | |
| 7,359,408 | B2 * | 4/2008 | Kim | 370/509 |
| 2002/0172281 | A1 * | 11/2002 | Mantchala et al. | 375/240.12 |
| 2004/0202118 | A1 * | 10/2004 | Yagawa | 370/320 |

FOREIGN PATENT DOCUMENTS

| | | |
|---|---|---|
| DE | 101 10 177 A1 | 6/2002 |
| EP | 1 176 753 A2 | 1/2002 |
| JP | 2004-222088 | 8/2004 |

* cited by examiner

*Primary Examiner*—Ken N Vanderpuye
*Assistant Examiner*—Hibret A Woldekidan
(74) *Attorney, Agent, or Firm*—Foley & Lardner LLP

(57) ABSTRACT

A W-CDMA base station is disclosed in which a base band processing device and a plurality of remote radio devices are provided and downward data is transmitted from the plurality of remote radio devices at the same time. The base band processing device inserts a synchronous signal into downward data, and transmits the downward data to the remote radio devices. The remote radio device extracts the synchronous signal from the downward data transmitted from the base band processing device, inserts the synchronous signal into the upward data at an insertion timing based on an extraction timing when the signal is extracted, and transmits the upward data to the base band processing device. Further, the base band processing device extracts the synchronous signal from upward data transmitted from the remote radio devices, and controls the timing for starting the dispersion process for the downward data based on a time from when the synchronous signal has been inserted into the downward data until the synchronous signal has been extracted from the upward data.

9 Claims, 4 Drawing Sheets

SYNCHRONOUS DATA TRANSMISSION FROM PLURAL REMOTE RADIO DEVICES IN W-CDMA BASE STATION

BACKGROUND OF THE INVENTION

1. Field of the Invention

The present invention relates to a W-CDMA (Wideband-Code Division Multiple Access) base station using W-CDMA as a communication scheme. More particularly, the present invention relates to a W-CDMA base station in which the configuration of the base station is divided into a base band processing device and remote radio devices installed remote from the base band processing device and in which the base band processing device and the remote radio devices are connected via optical cables.

2. Description of the Related Art

Recently, the W-CDMA communication system using the W-CDMA communication method has been used widely. In the W-CDMA communication system, the range within the reach of radio waves from a base station is a service area. Therefore, there is a possibility that places where it is difficult for radio waves to reach, because these places are remote from the base station, will not be within the coverage. To avoid this inconvenience, the configuration of the base station is divided into a base band processing device and remote radio devices, the remote radio devices are installed remote from the base band processing device, and the base band processing device and remote radio devices are connected by optical cables, thereby keeping places that are remote from the base station within the coverage.

Also, for one base band processing device, a plurality of remote radio devices is installed remote from the base band processing device, thereby increasing the number of cells that can be accessed easily. Further, only by substituting remote radio devices, it is possible to change the configuration of cells that can be accessed easily.

However, in communications between the base band processing device and the remote radio devices connected by optical cables in this way, differences among signal transmission delay times in optical cables will occur which are caused by the different distances of the remote radio devices from the base band processing device, with the distances depending on the locations where each of the remote radio devices are installed. When the lengths of the optical cables between the base band processing device and the respective remote radio devices are equal, there is no problem. However, in cases where the lengths of the optical cables are different, even if downward data is transmitted from the base band processing device to the plurality of remote radio devices at the same time, in the plurality of remote radio devices, the downward data is transmitted to a radio zone while maintaining different timings. A process for correcting the variations is required for diversity transmission, the IPDL (Idle Periods create in the Down Link) service, or the like.

JP-A-2004-222088 discloses a method in which a signal that is to be used for reference timing is transmitted among a plurality of remote radio devices, a time calculated from the reference timing signal and the reception timing of downward data received by the base band processing device are transmitted to the base band processing device, a delay time is calculated in the base band processing device, and variations are corrected.

Also, another method is considered in which, when downward data is transmitted from the base band processing device to the remote radio device, a special synchronous signal is inserted into the downward data, the synchronous signal is detected from the downward data received by the remote radio device, and a delay time is corrected by using the detected synchronous signal and a buffer in which the downward data is temporarily stored.

However, the method disclosed in the above-mentioned patent document has a problem in that the remote radio device requires the preparation of another cable for transmitting and receiving the reference timing signal.

Also, according to the method in which, when downward data is transmitted from the base band processing device to the remote radio device, the special synchronous signal is inserted into the downward data, and a special synchronous signal having a constant period, such as a frame pulse, that is to be inserted into the downward data is required when the downward data is transmitted from the base band processing device to the remote radio device. Further, it is necessary to provide a buffer to absorb the timing for transmission of the downward data to the radio zone so that differences of delay times become zero among the remote radio devices. Accordingly, there is a problem in that the size of device will be increased.

SUMMARY OF THE INVENTION

Accordingly, it is an object of the present invention to provide a W-CDMA base station capable of transmitting downward data from a plurality of remote radio devices to a radio zone at the same time without using new facilities and without necessitating an increase in size of the radio devices.

According to the present invention, in a base band processing device, a synchronous signal is inserted into downward data to which a dispersion process is applied, and the downward data in which the synchronous signal has been inserted is transmitted to a remote radio device. In the remote radio device, the synchronous signal is extracted from the downward data transmitted from the base band processing device, and the synchronous signal is inserted into the upward data to be transmitted to the base band processing device at an insertion timing based on the extraction timing when the synchronous signal is extracted. The upward data into which the synchronous signal is inserted is transmitted from the remote radio device to the base band processing device. In the base band processing device, the synchronous signal is extracted from the upward data transmitted from the remote radio device. Then, in the base band processing device, the time is measured from the insertion timing when the synchronous signal is inserted into the downward data to the extraction timing when the synchronous signal is extracted from the upward data. Successively, a start timing of a dispersion process for the downward data is controlled in accordance with the measured time.

In this way, by measuring the time from the insertion of the synchronous signal into the downward data to the extraction of the synchronous signal from the upward data, respective transmission delay times between the base band processing device and the remote radio devices installed at various distances from the base band processing device are calculated. Then, based on the respective calculated delay times, the downward data is transmitted from the base band processing device to the respective remote radio devices at appropriate timings. With this arrangement, in each remote radio device, the delay time is measured, and it is unnecessary to provide a buffer, a control circuit, or the like to absorb the timing for transmission of downward data to the radio zone so that delay time differences among the respective remote radio devices become zero. Therefore, there are no cases where the device size will increase due to a buffer, a control circuit, or the like.

Also, without transmitting and receiving a reference timing signal from among the respective remote radio devices, the downward data is transmitted from the respective remote radio devices to the radio zone at the same time.

The above and other objects, features, and advantages of the present invention will become apparent from the following description with reference to the accompanying drawings, which illustrate an example of the present invention.

DESCRIPTION OF THE PREFERRED EMBODIMENTS

Figure 1:
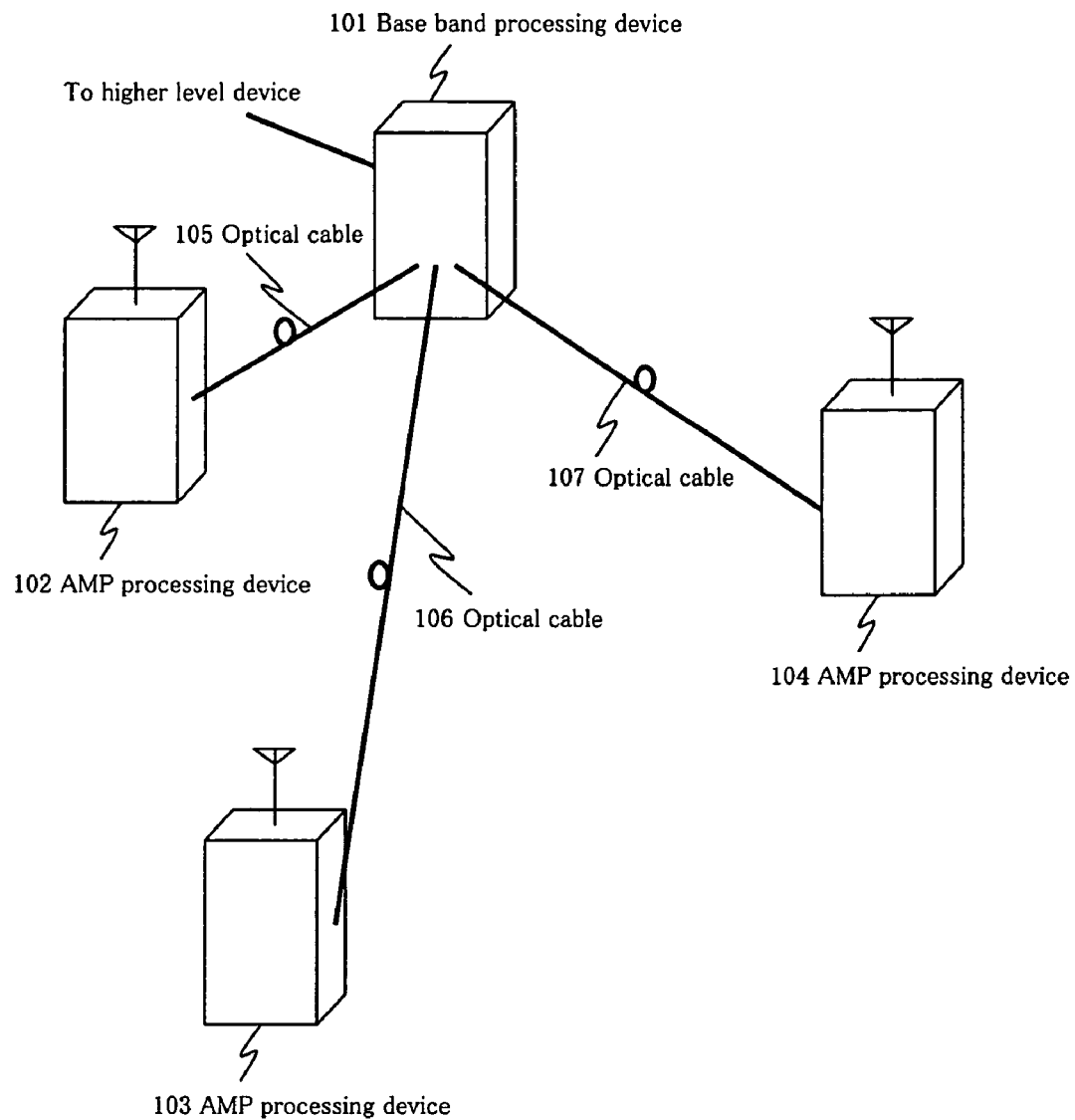
FIG. 1 is a view showing a W-CDMA base station according to an embodiment of the present invention.

Referring now to FIG. 1, there is shown a W-CDMA base station comprising base band processing device 101 and AMP processing devices 102 to 104 which are remote radio devices installed remote from base band processing device 101. Base band processing device 101 and each of AMP processing devices 102 to 104 are respectively connected by optical cables 105 to 107. Distances from base band processing device 101 to AMP processing devices 102 to 104 are set freely. Also, the number of AMP processing devices 102 to 104 is not limited to three.

Figure 2:
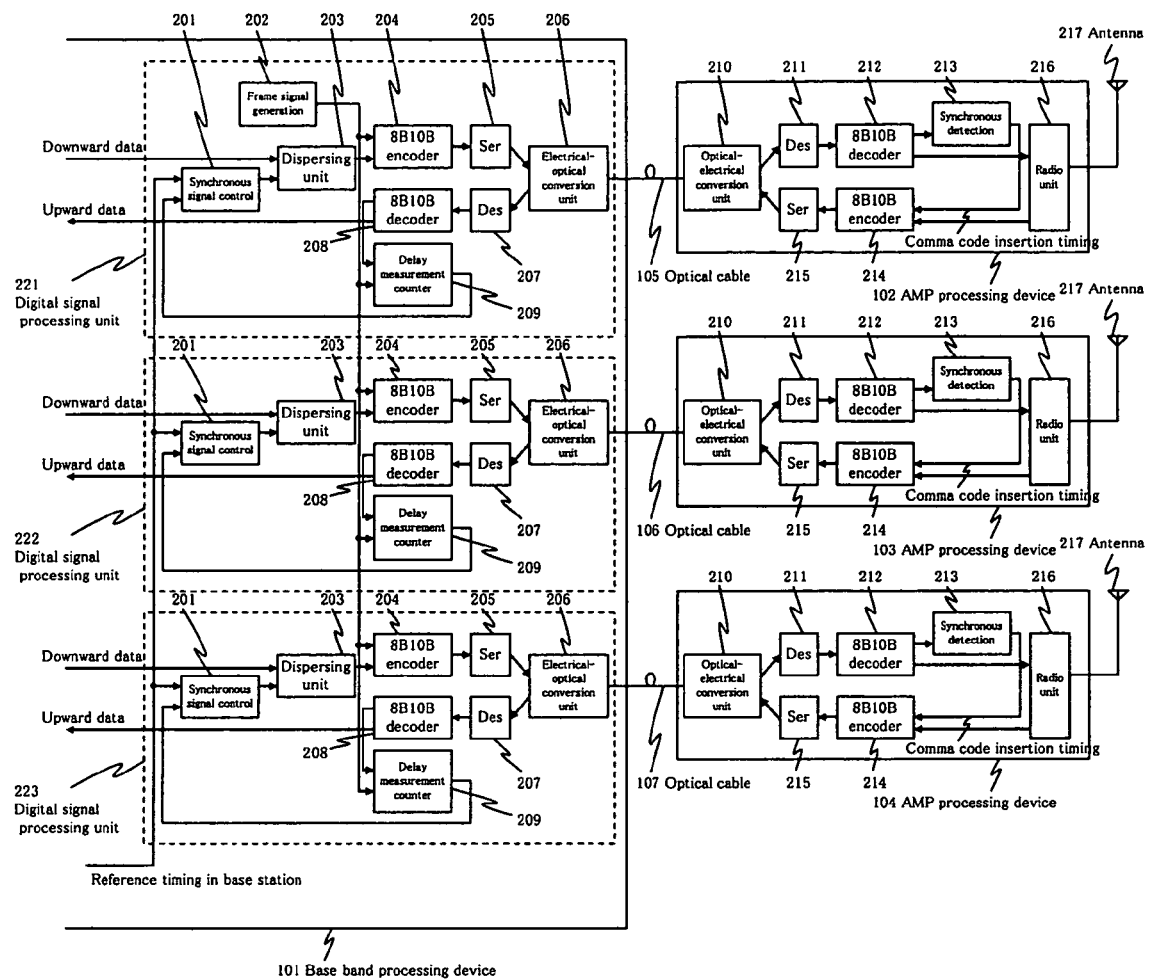
FIG. 2 is a view showing one example of a base band processing device and AMP processing devices shown in FIG. 1.

Base band processing device 101 shown in FIG. 1 includes digital signal processing units 221 to 223, as shown in FIG. 2. Digital signal processing units 221 to 223 respectively transmit downward data and receive upward data to/from AMP processing devices 102 to 104 connected thereto. Each of digital signal processing units 221 to 223 includes dispersing unit 203, frame signal generation unit 202, 8B10B encoder 204, Ser unit 205, electrical-optical conversion unit 206, Des unit 207, 8B10B decoder 208, delay measurement counter 209, and synchronous signal control unit 201. Dispersing unit 203 performs a dispersion process for downward data input from a higher level device using reference timing as a trigger. Frame signal generation unit 202 generates insertion timing for inserting a comma code, namely, the synchronous signal, into the downward data. 8B10B encoder 204 is a first encoder for inserting the comma code into the downward data to which the dispersion process is applied in dispersing unit 203 at the insertion timing generated in frame signal generation unit 202 and for applying the 8B10B-encoding process. Ser unit 205 converts downward data 8B10B-encoded by 8B10B encoder 204 from a parallel signal to a serial signal. Electrical-optical conversion unit 206 performs electrical-optical conversion between electrical signals in base band processing device 101 and optical signals which are interfaces between base band processing device 101 and AMP processing device 102. Des unit 207 converts upward data that has been converted into an electrical signal in electrical-optical conversion unit 206 from a serial signal to a parallel signal. 8B10B decoder 208 is a first decoder for applying the 8B10B-decoding process to the upward data converted into the parallel signal. Delay measurement counter 209 measures a transmission delay time based on the extraction timing of the comma code extracted from the upward data to which the 8B10B-decoding process is applied and the insertion timing of the comma code generated in frame signal generation unit 202. Synchronous signal control unit 201 controls the timing to start the dispersion process in dispersing unit 203 based on the base station reference timing, which is the reference timing of the dispersion process in the base station, and based on the transmission delay time measured by delay measurement counter 209. Incidentally, the number of digital signal processing units 221 to 223 is not limited to three.

On the other hand, each of AMP processing devices 102 to 104 shown in FIG. 1 includes, as shown in FIG. 2, optical-electrical conversion unit 210, Des unit 211, 8B10B decoder 212, synchronous detection unit 213, radio unit 216, antenna 217, 8B10B encoder 214, and Ser unit 215. Optical-electrical conversion unit 210 performs optical-electrical conversion between electrical signals in AMP processing devices 102 to 104 and optical signals, which are interfaces between base band processing device 101 and AMP processing devices 102 to 104. Des unit 211 converts the downward data that has been converted into the electrical signal in optical-electrical conversion unit 210 from a serial signal to a parallel signal. 8B10B decoder 212 is a second decoder for applying the 8B10B-decoding process to the downward data converted into a parallel signal. Synchronous detection unit 213 performs synchronous detection of the time at which the comma code is extracted from the downward data to which the 8B10B-decoding process is applied, and outputs the time which the comma code is inserted into the upward data. Radio unit 216 transmits the downward data, to which the 8B10B-decoding process is applied, to the radio zone and processes the upward data received from the radio zone. Antenna 217 transmits and receives data to/from the radio zone. 8B10B encoder 214 is a second encoder for inserting the comma code into the upward data which is output from radio unit 216 at the insertion timing which is output from synchronous detection unit 213 and for applying 8B10B-encoding process. Ser unit 215 converts the upward data 8B10B-encoded by 8B10B encoder 214, from a parallel signal to a serial signal.

Figure 3:
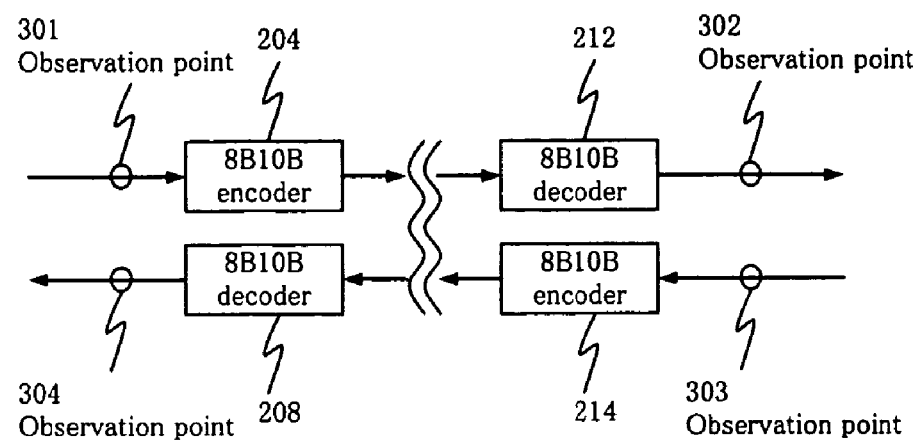
FIG. 3 is a view showing observation points of timings for a comma code in the W-CDMA base station shown in FIG. 1 and FIG. 2.
Figure 4:
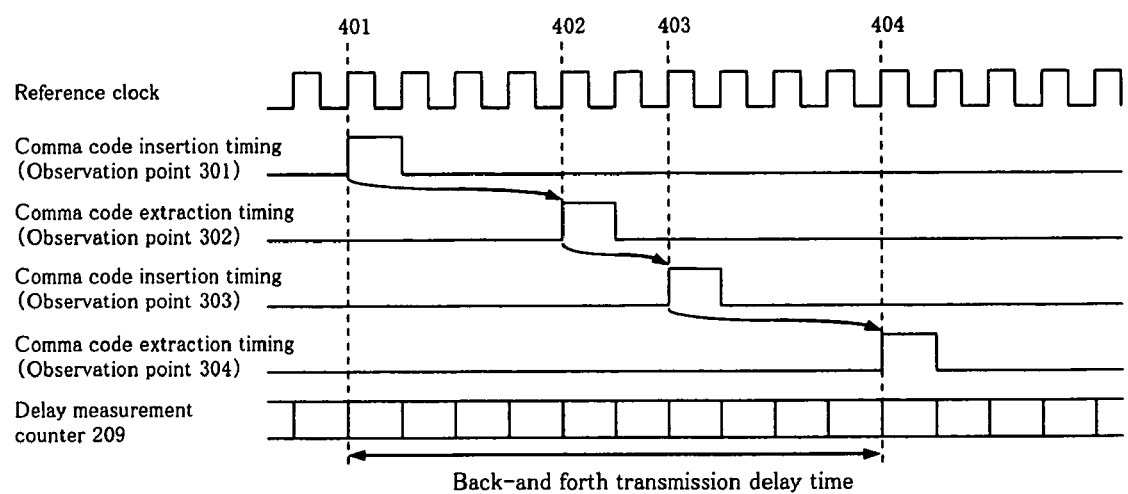
FIG. 4 is a timing chart showing timings for the comma code at the observation points in the W-CDMA base station shown in FIGS. 1 to 3.

As shown in FIG. 3, with respect to the downward data, observation point 301 is regarded as the point at which a comma code is inserted in 8B10B encoder 204. Also, observation point 302 is regarded as the point at which the comma code is extracted from 8B10B decoder 212. With respect to the upward data, observation point 303 is regarded as the point at which a comma code is inserted in 8B10B encoder 204. Also, observation point 304 is regarded as the point at which a comma code is extracted from 8B10B decoder 208.

Next, explanations are given of the process of the above-mentioned W-CDMA base station, including insertion and extraction timings of the comma code at observation points 301 to 304. As an example, the following explanations are given of the process in which upward data and downward data are transmitted and received between base band processing device 101 and AMP processing device 102. The same process is performed when upward data and downward data are transmitted and received between base band processing device 101 and AMP processing devices 103, 104.

First, immediately after starting base band processing device 101, in synchronous signal control unit 201, the base station reference timing is output as a timing to start the dispersion process for the downward data in dispersing unit 203. In dispersing unit 203 into which the timing to start the dispersion process is input, the dispersion process is applied to the downward data based on the input timing when to start the dispersion process. Then, the downward data, to which the dispersion process is applied, is output to 8B10B encoder 204.

At timing 401, in frame signal generation unit 202, a frame signal of a fixed period specified in a system is output to 8B10B encoder 204 as the insertion timing at which the comma code is inserted. The insertion timing at which the comma code is inserted is also output to delay measurement counter 209.

Then, in 8B10B encoder 204, the comma code is inserted into the downward data that is output from dispersing unit 203 at the insertion timing for insertion which is output from frame generation unit 202. Then, the 8B10B-encoding process is applied to the downward data into which the comma code is inserted, and 8B10B-encoded downward data is output to Ser unit 205.

The downward data input into Ser unit 205 is converted in Ser unit 205 from a parallel signal to a serial signal, and is output to electrical-optical conversion unit 206.

Thereafter, in electrical-optical conversion unit 206, the input downward data is converted from an electrical signal into an optical signal, and is transmitted to AMP processing device 102 via optical cable 105.

When the downward data transmitted from electrical-optical conversion unit 206 is received by AMP processing device 102, in optical-electrical conversion unit 210 of AMP processing device 102, the received downward data is converted from a optical signal to an electrical signal, and is output to Des unit 211.

The downward data input to Des unit 211 is converted from a serial signal to a parallel signal in Des unit 211, and is output to 8B10B decoder 212.

Then, in 8B10B decoder 212, the 8B10B-decoding process is applied to the input downward data, and the 8B10B-decoded downward data is output to radio unit 216. Also, at the same time as the 8B10B-decoding process, at timing 402, the comma code is extracted from the downward data, and the extracted comma code is output to synchronous detection unit 213.

In radio unit 216, the input downward data is modulated and D/A conversion, and is frequency-converted into a high frequency. Then, the downward data is output to antenna 217 via an amplifier, and is transmitted to the radio zone from antenna 217.

Also, synchronous detection is performed to determine whether the comma code input to synchronous detection unit 213 is input at a fixed period or not, and then, at timing 403, the time when the comma code is to be inserted into the upward data is output to 8B10B encoder 214. In this description, the time when the comma code is to be inserted into the upward data is the time after the lapse of a constant time from the extraction time at which the comma code is extracted from the downward data. Incidentally, the constant time is arbitrary time that takes into account other processing time or the like in AMP processing device 102.

Also, when antenna 217 receives upward data, the received upward data is modulated, A/D converted and the like and is output to 8B10B encoder 214.

Then, in 8B10B encoder 214, the comma code is inserted into the upward data output from radio unit 216 at the insertion timing output from synchronous detection unit 213. The 8B10B-encoding process is applied to the upward data into which the comma code is inserted, and 8B10B-encoded upward data is output to Ser unit 215.

The upward data input into Ser unit 215 is converted from a parallel signal to a serial signal and is output to optical-electrical conversion unit 210.

In optical-electrical conversion unit 210, the input upward data is converted from an electrical signal to an optical signal, and is transmitted to base band processing device 101 via optical cable 105.

When the upward data transmitted from optical-electrical conversion unit 210 is received by base band processing device 101, in electrical-optical conversion unit 206 of base band processing device 101, the received upward data is converted from an optical signal to an electrical signal, and is output to Des conversion 207.

The upward data input into Des unit 207 is converted from a serial signal to a parallel signal, and is output to 8B10B decoder 208.

Then, in 8B10B decoder 208, the 8B10B-decoding process is applied to the input upward data. Also, at the same time that the 8B10B-decoding process is applied, at timing 404, the comma code is extracted from the upward data. The extraction timing when the comma code is extracted is output to delay measurement counter 209.

Delay measurement counter 209 starts up from the insertion timing (timing 401) when the comma code is inserted into the downward data input from frame signal generation unit 202. Then, by measuring the time until the comma code is extracted from the upward data, input from 8B10B decoder 208, the time from when (timing 401) the comma code is inserted into the downward data, input from frame signal generation unit 202, to the time (timing 404) when the comma code is extracted from the upward data, input from 8B10B decoder 208, is calculated. The calculated value is set as a back-and forth-delay time.

Then, the back-and-forth delay time calculated in delay measurement counter 209 is output to synchronous signal control unit 201. Then, in synchronous signal control unit 201, the base station reference timing is delayed by a time that is obtained by subtracting the one-way transmission delay time, obtained by dividing the calculated back-and-forth transmission delay time by two, from the maximum transmission delay time previously set as the whole system. The timing is output to dispersing unit 203 as the timing to start the dispersion process.

In dispersing unit 203, the dispersion process for the downward data is performed at the start timing that is output from synchronous signal control unit 201. Then, the above- mentioned process is repeated.

As described above, in the W-CDMA base station shown in FIG. 1, 8B10B codes that reduce harmful effects caused by DC charge and that synchronize data by bites are used as serial interfaces of optical cables 105 to 107, and the transmission delay time is measured by using the comma code inserted in the 8B10B coding process. Therefore, it is unnecessary to insert a synchronous signal, such as a special frame pulse, in order to measure the transmission delay time required to adjust the timing for data transmission.

While a preferred embodiment of the present invention has been described using specific terms, such description is for illustrative purposes only, and it is to be understood that changes and variations may be made without departing from the spirit or scope of the following claims.

What is claimed is:

1. A W-CDMA base station in which a base band processing device and remote radio devices are divided, and the base band processing device and a plurality of remote radio devices are connected by optical cables, wherein the base band processing device inserts a synchronous signal into downward data to which a dispersion process is applied, transmits the downward data to the remote radio devices, extracts the synchronous signal from upward data transmitted from the remote radio devices, and controls the timing when the dispersion process for the downward data starts based on the time from an insertion timing when the synchronous signal is inserted into the downward data to an extracting timing when the synchronous signal is extracted from the upward data; and wherein each of said the remote radio devices extracts the synchronous signal from the downward data transmitted from the base band processing device and inserts the synchronous signal into the upward data at an insertion timing which is based on an extraction timing when the synchronous signal is extracted from the downward data, wherein the insertion timing corresponds to the extraction timing added to a fixed timing for other processings performed by the base band processing device.

2. The W-CDMA base station according to claim 1, wherein said base band processing device comprises:

frame signal generation means for generating the insertion timing when the synchronous signal to be inserted into the downward data;

a first encoder for inserting the synchronous signal into the downward data at the insertion timing generated by the frame signal generation means;

a first decoder for extracting the synchronous signal from the upward data;

a delay measurement counter for measuring the time from the insertion timing, generated by the frame signal generation means, for inserting the synchronous signal, to the extraction timing when the synchronous signal is extracted in the first decoder; and synchronous signal control means for controlling the timing when the dispersion process for the downward data starts based on the time measured by the delay measurement counter; and wherein each of said the remote radio devices comprises:

a second decoder for extracting the synchronous signal inserted by the first encoder from the downward data;

synchronous detection means for outputting the insertion timing when the synchronous signal is inserted into the upward data based on the extraction timing when the synchronous signal is extracted by the second decoder; and a second encoder for inserting the synchronous signal into the upward data at the insertion timing that is output from the synchronous detection means.

3. The W-CDMA base station according to claim 2, wherein the synchronous signal control means sets a timing, from the insertion timing when the synchronous signal, generated by the frame signal generation means, is inserted to the extraction timing when the synchronous signal is extracted in the first encoder as a back-and-forth delay time, and sets a timing at which the back-and-forth delay time is delayed by a difference between the one-way transmission delay time obtained by dividing the calculated back-and-forth transmission delay time by two and a previously set maximum transmission delay time as the timing to start the dispersion process for the downward data.

4. The W-CDMA base station according to claim 1, wherein the first encoder and the second encoder are 8B10B encoders, the first decoder and the second decoder are 8B10B decoders, and the synchronous signal is a comma code.

5. The W-CDMA base station according to claim 1, wherein the synchronous signal corresponds to a comma code and does not correspond to a special frame pulse.

6. A method in a W-CDMA base station in which a base band processing device and remote radio devices are divided, and the base band processing device and a plurality of remote radio devices are connected by optical cables; said method comprising the steps:

generating an insertion timing when a synchronous signal is to be inserted into downward data transmitted from the base band processing device to the remote radio devices;

inserting the synchronous signal into the downward data at the insertion timing that has been generated;

transmitting downward data from the base band processing device to the remote radio devices;

extracting the synchronous signal from the downward data received by the remote radio devices;

outputting an insertion timing when the synchronous signal is inserted into the upward data transmitted from the remote radio device to the base band processing device based on the extraction timing when the synchronous signal is extracted;

inserting the synchronous signal into the upward data at the insertion timing that has been generated;

transmitting the upward data from the remote radio device to the base band processing device;

extracting the synchronous signal from the upward data received by the base band processing device;

measuring a time from the insertion timing when the synchronous signal is inserted into the downward data to the extraction timing when the synchronous signal is extracted from the upward data; and controlling a timing to start a dispersion process for the downward data based on the measured times, wherein the insertion timing corresponds to the extraction timing added to a fixed timing for other processings performed by the base band processing device.

7. The method according to claim 6, wherein the step of inserting the synchronous signal is an 8B10B encoding process, the step of extracting the synchronous signal is an 8B10B decoding process, and the synchronous signal is a comma code.

8. The method according to claim 6, wherein a time from when the synchronous signal is inserted into the downward data to the extraction timing when the synchronous signal is extracted from the upward data is set as a back-and-forth transmission delay time, and a timing when the back-and-forth delay time is delayed by a difference between one-way transmission delay time obtained by dividing the back-and-forth transmission delay time by two and a previously set maximum transmission delay time is set as a timing to start the dispersion process for the downward data.

9. The method according to claim 6, wherein the synchronous signal corresponds to a comma code and does not correspond to a special frame pulse.

* * * * *